United States Patent
Muresan

(10) Patent No.: US 9,366,204 B2
(45) Date of Patent: Jun. 14, 2016

(54) EXHAUST-GAS CONTROL DEVICE FOR AN INTERNAL COMBUSTION ENGINE

(71) Applicant: Daniel Muresan, Giroc (RO)

(72) Inventor: Daniel Muresan, Giroc (RO)

(73) Assignee: Continental Automotive GmbH, Hannover (DE)

( * ) Notice: Subject to any disclaimer, the term of this patent is extended or adjusted under 35 U.S.C. 154(b) by 126 days.

(21) Appl. No.: 14/376,075

(22) PCT Filed: Jan. 31, 2013

(86) PCT No.: PCT/EP2013/051858
§ 371 (c)(1),
(2) Date: Jul. 31, 2014

(87) PCT Pub. No.: WO2013/113790
PCT Pub. Date: Aug. 8, 2013

(65) Prior Publication Data
US 2014/0373529 A1    Dec. 25, 2014

(30) Foreign Application Priority Data
Feb. 1, 2012  (EP) .................................... 12464002

(51) Int. Cl.
*F02M 25/07* (2006.01)
*F16K 11/052* (2006.01)
*F16K 11/085* (2006.01)
*F02B 47/08* (2006.01)

(52) U.S. Cl.
CPC ............ *F02M 25/0771* (2013.01); *F02B 47/08* (2013.01); *F02M 25/0719* (2013.01); *F02M 25/0772* (2013.01); *F02M 25/0773* (2013.01); *F02M 25/0793* (2013.01); *F02M 25/0796* (2013.01); *F16K 11/0525* (2013.01); *F16K 11/085* (2013.01); *Y02T 10/121* (2013.01)

(58) Field of Classification Search
CPC ....................... F02M 25/0772; F02B 25/0773
USPC ......................................... 123/568.23, 568.24
See application file for complete search history.

(56) References Cited

U.S. PATENT DOCUMENTS

| 2010/0116256 A1 | 5/2010 | Weis | |
| 2011/0061625 A1 | 3/2011 | Joergl et al. | |
| 2012/0037825 A1* | 2/2012 | Klipfel | F02B 37/186 251/248 |
| 2013/0269664 A1* | 10/2013 | Park | F02M 25/0773 123/568.29 |

(Continued)

FOREIGN PATENT DOCUMENTS

| DE | 10222 919 A1 | 12/2003 |
| EP | 1 426 604 A2 | 6/2004 |

(Continued)

OTHER PUBLICATIONS

Office Action dated May 24, 2012 issued in the corresponding European Patent Application No. 12464002.0.

*Primary Examiner* — Erick Solis
(74) *Attorney, Agent, or Firm* — Cozen O'Connor

(57) ABSTRACT

An exhaust-gas control device for an internal combustion engine includes a common valve body for controlling a flow in an exhaust-gas channel and for controlling a flow in a bypass channel. The valve body is rotatably arranged in a housing and controls outlet openings of the exhaust-gas channel and of the bypass channel. In one rotational position, the valve body closes an inlet channel by a base and thus interrupts the flow. At the same time, the exhaust-gas channel and the bypass channel are separated from each other.

7 Claims, 3 Drawing Sheets

(56) References Cited

U.S. PATENT DOCUMENTS

2015/0059717 A1* 3/2015 Maxim .............. F02M 25/0786
  123/568.18
2015/0176538 A1* 6/2015 Baasch .............. F02M 25/0771
  123/568.12

FOREIGN PATENT DOCUMENTS

| | | |
|---|---|---|
| EP | 2 236 805 A2 | 10/2010 |
| FR | 2 879 712 A1 | 6/2006 |
| GB | 1 434 078 A | 4/1976 |
| WO | WO 2008/115773 A2 | 9/2008 |

* cited by examiner

EXHAUST-GAS CONTROL DEVICE FOR AN INTERNAL COMBUSTION ENGINE

CROSS-REFERENCE TO RELATED APPLICATIONS

This is a U.S. national stage of application No. PCT/EP2013/051858, filed on 31 Jan. 2013, which claims priority to the European Application No. 12464002.0, filed 1 Feb. 2012, the content of both incorporated herein by reference.

BACKGROUND OF THE INVENTION

1. Field of the Invention

The invention relates to an exhaust-gas control device for an internal combustion engine, having an exhaust-gas valve for controlling a flow in an exhaust-gas duct, a bypass valve for controlling a flow in a bypass duct, and an activatable actuator for activating the exhaust-gas valve and the bypass valve.

2. Related Art

Exhaust-gas control devices are commonly used in modern motor vehicles and are known from practice. In the case of the exhaust-gas control device known from practice, in each case one throttle flap is arranged in the bypass duct and in the exhaust-gas duct. The throttle flap arranged in the exhaust-gas duct is activated by a servomotor as an actuator, whereas the throttle flap arranged in the bypass duct is adjusted by a vacuum capsule. As a result, the exhaust-gas control device involves a very high level of outlay in terms of construction.

SUMMARY OF THE INVENTION

An object of the invention is to solve the problem of known devices by further developing an exhaust-gas control device such that the exhaust-gas control device is of particularly simple construction and can be manufactured inexpensively.

This problem is solved, according to an aspect of the invention, in that the exhaust-gas valve and the bypass valve have a common valve body and a common exhaust-gas inlet duct.

By this configuration, the exhaust-gas control device, owing to the single valve body, has a particularly small number of components. Furthermore, the common valve body can be activated in a particularly simple manner by a single actuator, such that the exhaust-gas control device is of particularly simple construction and can be manufactured inexpensively. Furthermore, the exhaust-gas control device according to the invention has a particularly small number of sealing locations owing to the single valve body. The small number of sealing locations and the particularly simple control of the flow in the exhaust-gas duct and in the bypass duct furthermore have the effect that the number of possible faults is particularly low.

According to another advantageous refinement of the invention, the realization of the bypass valve and of the exhaust-gas valve by a single valve body is possible in a particularly simple manner from a construction aspect if a housing for accommodating the valve body has an inlet opening of the common exhaust-gas inlet duct, an outlet opening of the exhaust-gas duct of the exhaust-gas valve and an outlet opening of the bypass duct of the bypass valve.

In another advantageous refinement of the invention, a separation of the flows can be avoided if the common exhaust-gas inlet duct extends as far as the common valve body. In this way, the valve body is capable, in a manner dependent on the activation of the actuator, of conducting the flow in the exhaust-gas inlet duct directly to the respective exhaust-gas duct.

In another advantageous refinement of the invention, the exhaust-gas control device can be used in a particularly versatile manner if the common valve body, in one position, closes the inlet opening.

According to another advantageous refinement of the invention, an undesired overflow of exhaust gas between the exhaust-gas duct and the bypass duct can be avoided if the common valve body, in the position in which it closes the common exhaust-gas inlet duct, separates the two outlet openings from one another.

In another advantageous refinement of the invention, the valve body is of particularly simple construction if the valve body is arranged rotatably in the housing and has two exhaust-gas guiding surfaces that are inclined relative to the axis of rotation, such that, in a first rotational position, the inlet opening is connected via one exhaust-gas guiding surface to one outlet opening and, in the second rotational position, the inlet opening is connected via the other exhaust-gas guiding surface to the other outlet opening. A further advantage of this configuration is that the actuator can be designed as a simple rotary actuator of the valve body. In this way, the exhaust-gas control device can be manufactured particularly inexpensively.

According to another advantageous refinement of the invention, the outlay in terms of construction for the closure of the inlet opening can be kept particularly low if the valve body has a raised portion arranged on a sub-region of one of the exhaust-gas guiding surfaces, and if, in a third rotational position, the raised portion closes the inlet opening.

According to another advantageous refinement of the invention, the disruption of the exhaust-gas flow by a throttling action of the raised portion can be kept particularly low if the raised portion is arranged only on one of the exhaust-gas guiding surfaces of the valve body. If the bypass duct requires a smaller exhaust-gas flow than the exhaust-gas duct, the raised portion is thus preferably arranged on that exhaust-gas guiding surface that leads to the outlet opening of the bypass duct.

According to another advantageous refinement of the invention, the activation of the exhaust-gas valve and of the bypass valve can be realized in a particularly simple manner from a construction aspect if the actuator is a servomotor for adjusting the rotational position of the valve body.

The exhaust-gas control device according to the invention is particularly compact if an axis of rotation of the servomotor is arranged parallel to the axis of rotation of the valve body, and if a gearing between the servomotor and valve body is of planar configuration. Furthermore, a thermal load on the servomotor is kept particularly low in this way.

According to another advantageous refinement of the invention, flow losses can be kept particularly low if the housing is of tubular form with a shell surface, and if the inlet opening is arranged on one side of a shell surface and the outlet openings are arranged on that side of the shell surface that is situated opposite the inlet opening.

BRIEF DESCRIPTION OF THE DRAWINGS

The invention encompasses numerous embodiments. To further illustrate the basic principle of the invention, one of the embodiments is illustrated in the drawings and will be described below. In the drawings.

DETAILED DESCRIPTION OF THE PRESENTLY PREFERRED EMBODIMENTS

Figure 1:
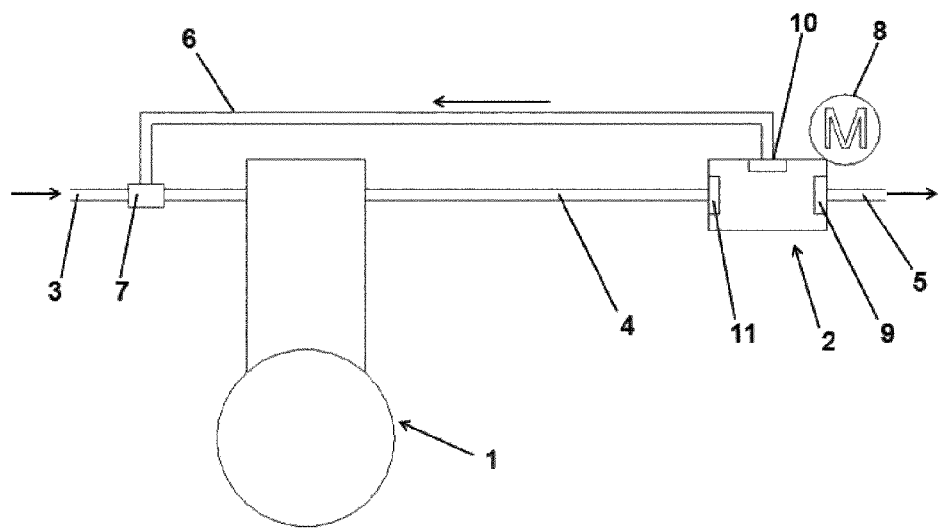
FIG. 1 schematically illustrates an internal combustion engine having an exhaust-gas control device according to the invention.

FIG. 1 shows an internal combustion engine 1 having an exhaust-gas control device 2. The internal combustion engine 1 has an intake duct 3, via which fresh air is drawn in from the environment, and an exhaust pipe 4 that leads to the exhaust-gas control device 2. The exhaust-gas control device 2 controls a flow in an exhaust-gas duct 5, which leads into the environment via silencers, filters or catalytic converters (not illustrated), and in a bypass duct 6, which leads to a mixer 7 arranged in the intake duct 3. The exhaust-gas control device 2 can be controlled by an actuator 8 and has an exhaust-gas valve 9 for controlling the flow in the exhaust-gas duct 5 and a bypass valve 10 for controlling the flow in the bypass duct 6. The exhaust pipe 4 of the internal combustion engine 1 leads into an exhaust-gas inlet duct 11 of the exhaust-gas control device 2.

Figure 2:
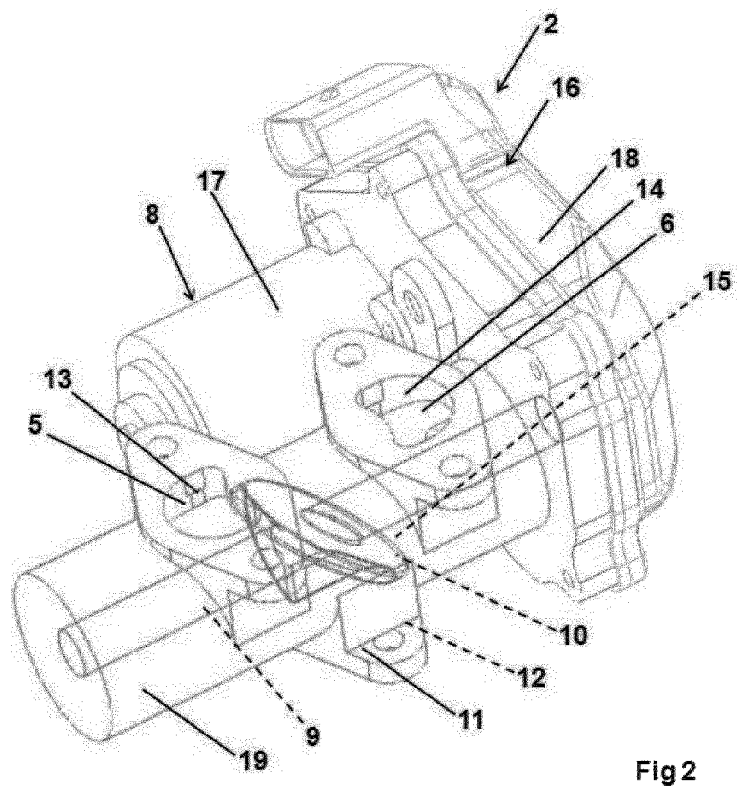
FIG. 2 shows the exhaust-gas control device according to the invention from FIG. 1.

FIG. 2 shows the exhaust-gas control device 2 from FIG. 1 in a perspective illustration. The exhaust-gas control device 2 has a tubular housing 19 with an inlet opening 12 of the exhaust-gas inlet duct 11 and with an outlet opening 13 of the exhaust-gas duct 5 of the exhaust-gas valve 9 and with an outlet opening 14 of the bypass duct 6 of the bypass valve 10. The outlet openings 13, 14 are arranged opposite the inlet opening 12 in a shell surface of the tubular housing 19. A single valve body 15 is arranged rotatably in the tubular housing 19. The actuator 8 is in the form of a servomotor with an axis arranged parallel to the axis of rotation of the valve body 15, and is connected to the valve body 15 via a planar gearing 16. For simplicity, only housing parts 17, 18 of the gearing 16 and of the actuator 8 are illustrated.

Figure 3:
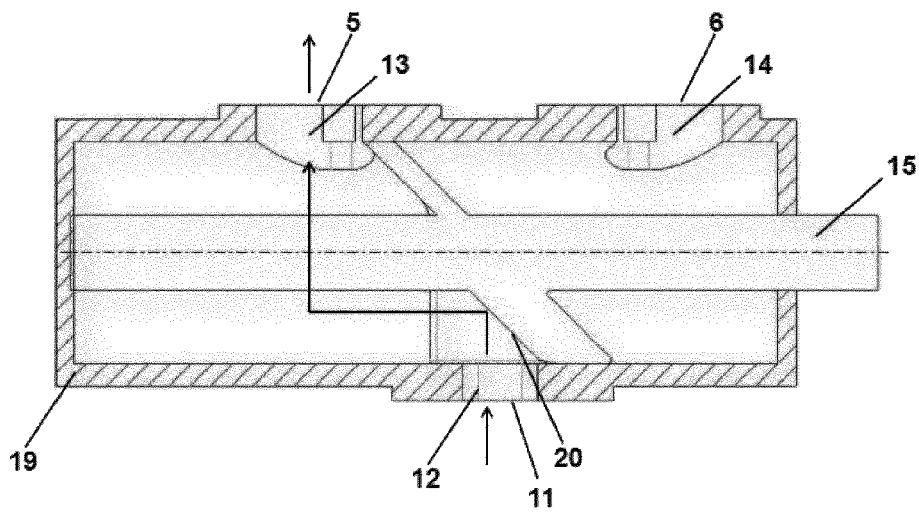
FIGS. 3-5 show sectional illustrations through a sub-region of the exhaust-gas control device according to the invention in various positions.

FIG. 3 shows a sectional illustration through the housing 19 with the valve body 15 in a first rotational position, in which a flow to the outlet opening 13 of the exhaust-gas duct 5 is enabled. For this purpose, the valve body 15 has a first exhaust-gas guiding surface 20 for guiding the flow. The outlet opening 14 of the bypass duct 6 is separated from the flow.

Figure 4:
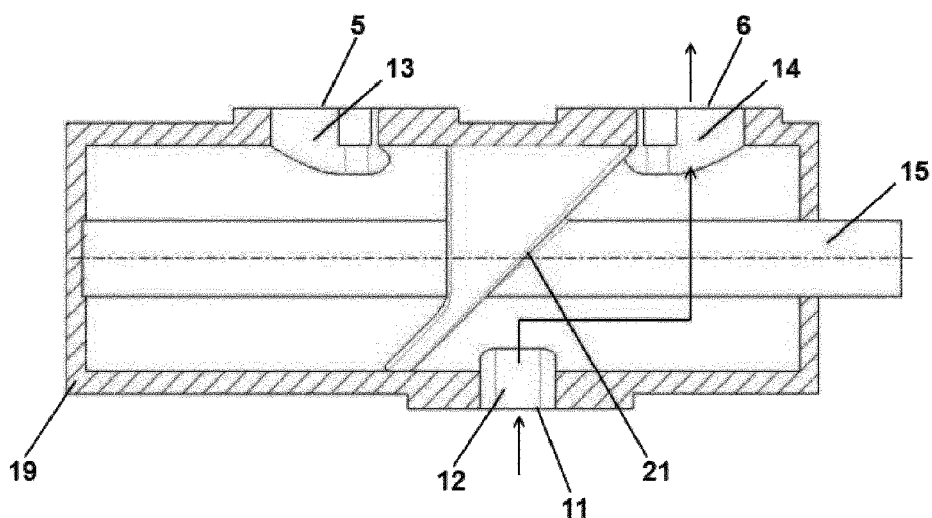

FIG. 4 shows a sectional illustration through the housing 19 with the valve body 15 in a second rotational position, in which the flow through the outlet opening 14 of the bypass duct 6 is enabled. For this purpose, the valve body 15 has a second exhaust-gas guiding surface 21. The outlet opening 13 of the exhaust-gas duct 5 is separated from the flow. For illustrative purposes, the flows are denoted by arrows in FIGS. 1, 3 and 4.

Figure 5:
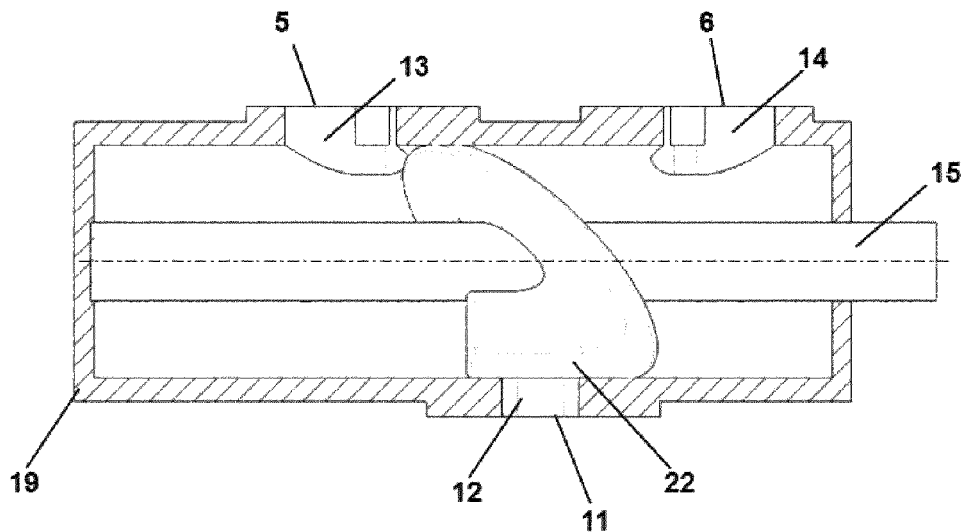

FIG. 5 shows the housing 19 with the valve body 15 in a third rotational position, in which the inlet opening 12 of the exhaust-gas inlet duct 11 is closed by a raised portion 22 of the valve body 15. At the same time, the outlet openings 13, 14 are separated from one another.

Figure 6:
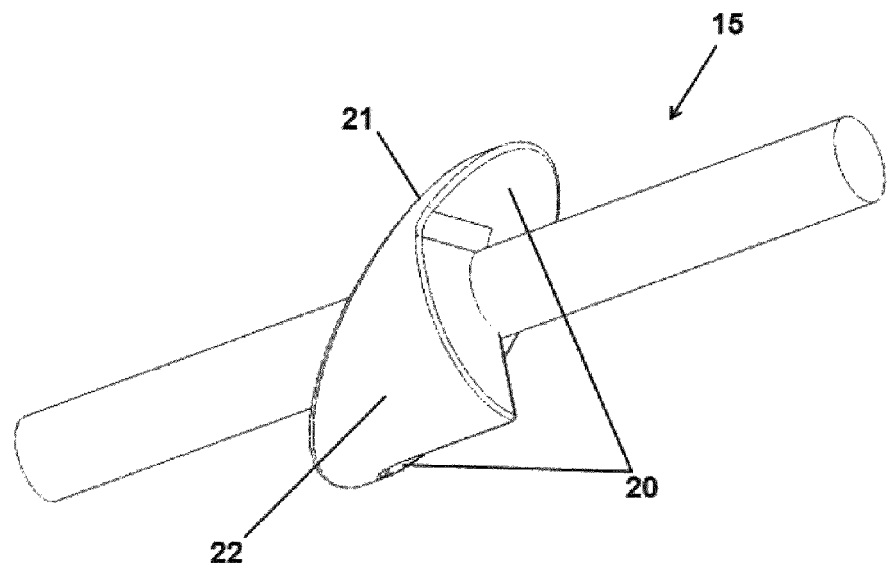
FIG. 6 shows, in a perspective view, a valve body of the exhaust-gas control device according to the invention.

For illustrative purposes, FIG. 6 shows the valve body 15 in a perspective illustration. It can be seen here that the raised portion 22 covers a sub-region of one of the exhaust-gas guiding surfaces 20. The other of the exhaust-gas guiding surfaces 21 is free, and permits an unhindered flow of the exhaust gas.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An exhaust-gas control device (2) for an internal combustion engine (1), the exhaust-gas control device (2) controlling flow into an exhaust-gas duct (5) and into a bypass duct (6), the exhaust-gas control device (2) comprising:
   an exhaust-gas valve (9) configured to control a flow of exhaust gases in the exhaust-gas duct (5);
   a bypass valve (10) configured to control a flow of exhaust gases in the bypass duct (6);
   an activatable actuator (8) configured to activate the exhaust-gas valve (9) and the bypass valve (10);
   a common valve body (15), usable by both the exhaust-gas valve (9) and the bypass valve (10);
   a common exhaust-gas inlet duct (11), usable by both the exhaust-gas valve (9) and the bypass valve (10); and
   a housing (19) configured to accommodate the valve body (15), the housing (19) having:
      an inlet opening (12) in communication with the common exhaust-gas inlet duct
      a first outlet opening (13) in communication with the exhaust-gas duct (5) controlled by the exhaust-gas valve (9), and
      a second outlet opening (14) in communication with the bypass duct (6) controlled by the bypass valve (10),
   wherein the valve body (15) is arranged to rotate in the housing (19) about an axis of rotation and has first and second exhaust-gas guiding surfaces (20, 21) inclined relative to the axis of rotation, and the valve body (15) has a raised portion (22) arranged on a sub-region of one of the first and second exhaust-gas guiding surfaces (20, 21), the valve body (15) being arranged to rotate such that:
      in a first rotational position of the valve body (15), the inlet opening (12) is connected via the first exhaust-gas guiding surface (20) to the first outlet opening (13),
      in a second rotational position of the valve body (15), the inlet opening (12) is connected via the second exhaust-gas guiding surface (21) to the second outlet opening (14), and
      in a third rotational position of the valve body (15), the raised portion (22) closes the inlet opening (12), the raised portion (22) being arranged only on one of the first and second exhaust-gas guiding surfaces (20, 21) of the valve body (15).

2. The exhaust-gas control device as claimed in claim 1, wherein the common exhaust-gas inlet duct (11) extends as far as the common valve body (15).

3. The exhaust-gas control device as claimed in claim 1, wherein the common valve body (15), in one rotational position, closes the inlet opening (12).

4. The exhaust-gas control device as claimed in claim 3, wherein the common valve body (15), in the rotational position in which it closes the inlet opening (12), separates the two outlet openings (13, 14) from one another.

5. The exhaust-gas control device as claimed in claim 1, wherein the actuator (8) is a servomotor configured to adjust the rotational position of the valve body (15).

6. The exhaust-gas control device as claimed in claim 5, wherein an axis of rotation of the servomotor is arranged parallel to the axis of rotation of the valve body (15), and the exhaust-gas control device further comprising a planar gearing (16) between the servomotor and the valve body (15).

7. The exhaust-gas control device as claimed in claim 1, wherein the housing (19) is of tubular form with a shell surface, the inlet opening (12) is arranged on one side of the shell surface, and the first and second outlet openings (13, 14) are arranged on a side of the shell surface situated opposite the inlet opening (12).

\* \* \* \* \*